United States Patent
Inomata et al.

(10) Patent No.: US 7,456,739 B2
(45) Date of Patent: Nov. 25, 2008

(54) APPROACH DETECTING SYSTEM

(75) Inventors: Kenji Inomata, Tokyo (JP); Takashi Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 286 days.

(21) Appl. No.: 11/538,453

(22) Filed: Oct. 4, 2006

(65) Prior Publication Data

US 2007/0285233 A1 Dec. 13, 2007

(30) Foreign Application Priority Data

Jun. 8, 2006 (JP) ............................ 2006-160090

(51) Int. Cl.
 *G08B 13/18* (2006.01)
(52) U.S. Cl. .................. 340/552; 340/553; 340/561; 340/565; 340/567; 340/568.2; 340/541; 340/545.3
(58) Field of Classification Search ............... 340/552, 340/553, 554, 561, 565, 567, 568.2, 540, 340/541, 545.3; 342/7, 8, 27, 28
See application file for complete search history.

(56) References Cited

U.S. PATENT DOCUMENTS

| | | | |
|---|---|---|---|
| 5,510,766 A * | 4/1996 | Harman et al. ............. | 340/552 |
| 5,705,984 A * | 1/1998 | Wilson ...................... | 340/561 |
| 6,424,289 B2 | 7/2002 | Fukae et al. | |
| 7,154,391 B2 * | 12/2006 | Maki et al. ................. | 340/550 |
| 2008/0036597 A1 * | 2/2008 | Harman ..................... | 340/552 |

FOREIGN PATENT DOCUMENTS

| | | |
|---|---|---|
| JP | 10-095338 | 4/1998 |
| JP | 2004-125604 | 4/2004 |
| WO | WO 2005/013223 A1 | 10/2005 |

* cited by examiner

*Primary Examiner*—Hung T. Nguyen
(74) *Attorney, Agent, or Firm*—Leydig, Voit & Mayer, Ltd.

(57) ABSTRACT

A leaky cable having radiation directivity which varies with frequency transmits electric waves in different frequency bands. A measurement apparatus outputs measurement information including signal intensity and phase of a reflected electric wave in each frequency band which is reflected by a target and is received by another leaky cable, and propagation delay time. A calculator groups the measurement information by target on the basis of signal intensities and phases of the reflected electric waves in different frequency bands, and calculates the position of the target with respect to the longitudinal direction of the leaky cables and the distance between the target and the leaky cables.

8 Claims, 9 Drawing Sheets

APPROACH DETECTING SYSTEM

BACKGROUND OF THE INVENTION

1. Field of the Invention

The present invention relates to an approach detecting system which detects the position of a target using a cable-shaped electric wave transmit/receive means.

2. Background of the Invention

Conventionally, approach detecting systems for detecting an approach of a target using a leaky transmission line which is called a leaky cable are known. As such a conventional approach detecting system, there has been provided, for example, a system in which leaky transmission lines are placed on the periphery of a site to be monitored for receiving electric waves using these leaky transmission lines, and for detecting a target by detecting variations in the electric field which occur when the target is approaching to the leaky transmission lines (refer to, for example, patent reference 1).

In addition, a conventional approach detecting system which has such a structure as mentioned above and which can also detect the position of a target with respect to a direction distant from leaky transmission lines is also disclosed (refer to, for example, patent reference 2). This conventional approach detecting system is implemented with a reflector for reflecting electric waves toward the far ends of the leaky transmission lines.

Furthermore, there has been provided a conventional approach detecting system which is so constructed as to observe targets by alternately emitting out electric waves of different frequencies using, as a transmit cable, a leaky coaxial cable having a radiation directivity which varies with frequency, and determine the position of a target which is staying in a plane which is sandwiched by the leaky cable for transmission and a leaky cable for reception using an observed distance difference (refer to, for example, patent reference 3).

[Patent reference 1] JP,10-95338, A
[Patent reference 2] WO No. 05/013223 pamphlet
[Patent reference 3] JP,2004-125604, A However, there are the following problems with the above-mentioned prior art systems.

For example, the conventional approach detecting system as disclosed in patent reference 1 can measure only a distance of each target with respect to the direction of the leaky transmission lines, but cannot calculate a distance of each target with respect to a direction which is apart from the leaky transmission lines. A problem with the conventional approach detecting system is therefore that when an object which should not be originally detected is staying at a far distance from the conventional approach detecting system, it can be detected accidentally if its size is large and the level of an electric wave reflected from the object is large.

A problem with the conventional approach detecting system as disclosed in patent reference 2 is that it can measure the position of only one target with respect to a direction apart from the leaky transmission lines, but cannot measure the positions of two or more targets individually. For example, when two targets are staying in a specific area, electric waves reflected from the two targets are combined into a single electric wave and this electric wave is then reflected by the open end of the leaky transmission line for reception. Therefore, it is difficult to distinguish the distance (with respect to a direction perpendicular to the leaky transmission lines) between one of the two targets and the leaky transmission lines from the distance between the other one and the leaky transmission lines. Another problem with the conventional system as disclosed in patent reference 2 is that the distance (with respect to a direction perpendicular to the leaky transmission lines) from the leaky transmission lines cannot be determined unless the target is staying at a certain distance or longer from the leaky transmission lines. This is because although the conventional system calculates the distance (with respect to a direction perpendicular to the leaky transmission lines) from the leaky transmission lines by observing a target component which appears far away from the signal component of the combined wave at the end, the target component is covered by the combined wave at the end and therefore cannot be detected unless the target is considerably apart from the leaky transmission lines because the combined wave at the end has a very large intensity.

Furthermore, a problem with the conventional approach detecting system as disclosed in patent reference 3 is that when two or more targets are approaching to a specific area, it cannot measure the positions of the two or more targets correctly. Another problem with such the conventional approach detecting system is that only a target which is staying between the two leaky coaxial cables can be detected theoretically, while there is no guarantee that it operates normally for targets which are staying outside the two leaky coaxial cables and it cannot detect the position of any target staying outside the two leaky coaxial cables. A further problem with the conventional approach detecting system as disclosed in patent reference 3 is that no electric wave is outputted at all from the leaky cable for transmission or electric waves are simultaneously outputted from the leaky cable for transmission in two or more directions in a case in which the frequency of a signal applied to the leaky cable for transmission is badly chosen, and therefore the position of any target cannot be measured in such a case in which the frequency is badly chosen.

SUMMARY OF THE INVENTION

The present invention is made in order to solve the above-mentioned problems, and it is therefore an object of the present invention to provide an approach detecting system which can detect a target certainly no matter where the target is staying.

In accordance with the present invention, there is provided an approach detecting system including: an electric wave transmit/receive means having a cable-shaped electric wave transmitting means having radiation directivity which varies with frequency, and a cable-shaped electric wave receiving means; a measurement means for, when the electric wave receiving means receives a plurality of electric waves in different frequency bands which are transmitted from the electric wave transmitting means and are then reflected by each of one or more targets, for outputting measurement information including the signal intensity and phase of the reflected electric wave in each frequency band, and a propagation delay time which has elapsed until it is received since it has been transmitted on the basis of the plurality of electric waves in different frequency bands received by the electric wave receiving means; and a calculating means for grouping the measurement information by target on the basis of the signal intensities and phases of the plurality of reflected electric waves in different frequency bands, and for calculating a position of each of the one or more targets with respect to the longitudinal direction of the electric wave transmit/receive means and a distance between each of the one or more targets and the electric wave transmit/receive means on the basis of the measurement information grouped by target.

As mentioned above, the approach detecting system in accordance with the present invention uses the dependency of the radiation directivity of the electric wave transmitting means upon frequency, emits out electric waves toward each target from two or more directions, observes reflected waves from each target, and then calculates a position and a distance associated with each target with respect to the longitudinal direction of the electric wave transmit/receive means using the calculating means. Therefore, the approach detecting system in accordance with the present invention can certainly detect an approach or existence of a target no matter what positional relationship the target has with the electric wave transmit/receive means, and, even if two or more targets are staying or approaching in or to a specific alarming area, can detect the position of each of them individually.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
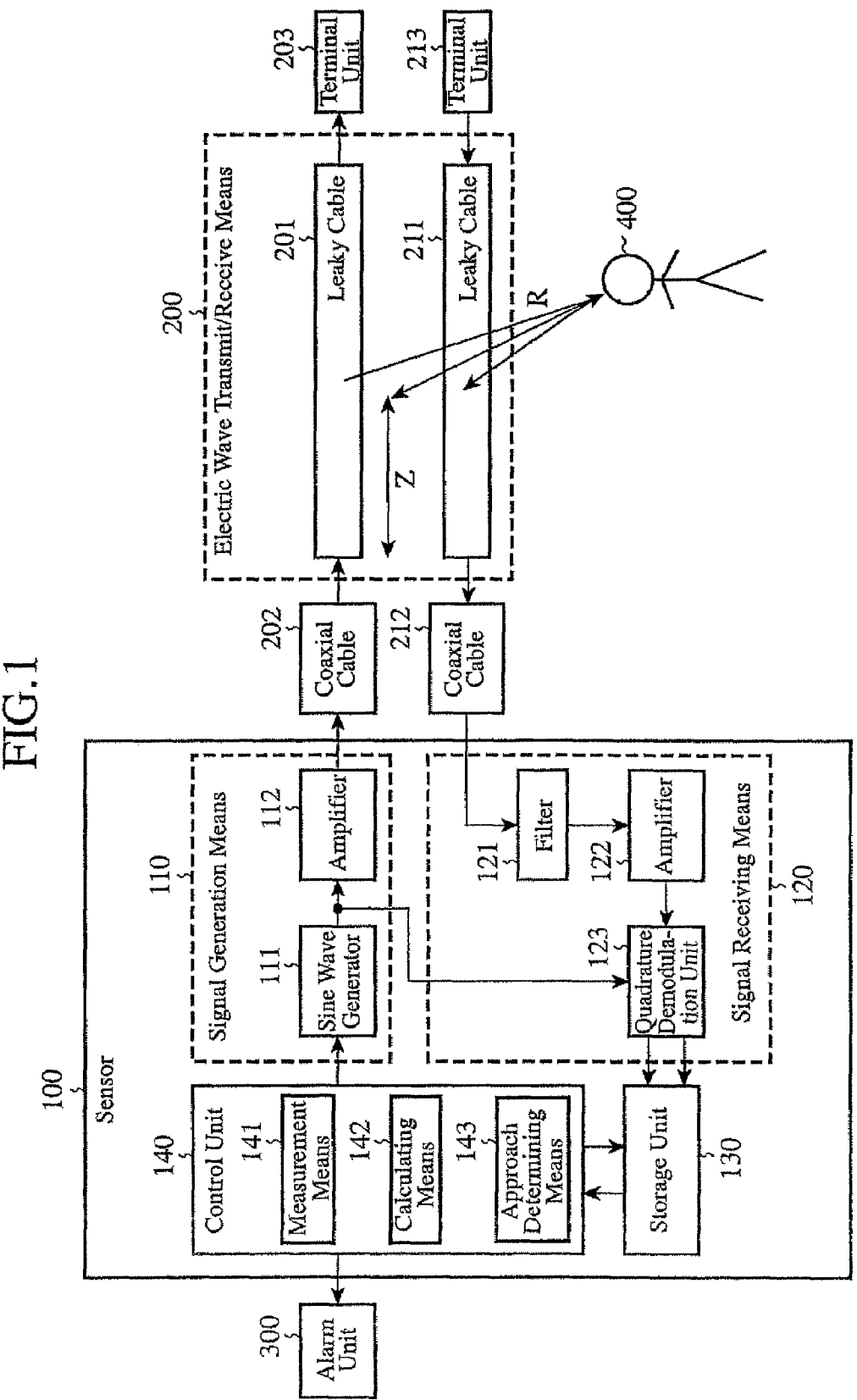
FIG. 1 is a block diagram showing an approach detecting system in accordance with embodiment 1 of the present invention.

FIG. 1 is a block diagram showing an approach detection system in accordance with embodiment 1 of the present invention. As shown in the figure, the approach detection system is provided with a sensor 100, an electric wave transmit/receive means 200, coaxial cables 202 and 212, terminal units 203 and 213, and an alarm unit 300. The sensor 100 detects the position of a target 400 using the electric wave transmit/receive means 200, and is provided with a signal generation means 110, a signal receiving means 120, a storage unit 130, and a control unit 140. The signal generation means 110 is provided with a sine wave generator 111 and an amplifier 112, and the signal receiving means 120 is provided with a filter 121, an amplifier 122, and a quadrature demodulation unit 123. The control unit 140 is provided with a measurement means 141, a calculating means 142, and an approach determining means 143. The electric wave transmit/receive means 200 includes a leaky cable 201 which implements the electric wave transmitting means, and a leaky cable 211 which implements the electric wave receiving means.

In the signal generation means 110, the sine wave generator 111 generates a sine wave of a specific frequency according to an instruction from the control unit 140, and outputs it to the amplifier 112. The amplifier 112 amplifies the output of the sine wave generator 111 so that it has a predetermined level, and sends out it to the leaky cable 201 of the electric wave transmit/receive means 200 via the coaxial cable 202. In the signal receiving means 120, the filter 121 removes unnecessary signal components having spectra different from the spectrum of a signal emitted out of the leaky cable 201 from a signal inputted thereto via the coaxial cable 212. The amplifier 122 amplifies a signal outputted from the filter 121 so that it has a predetermined level.

The quadrature demodulation unit 123 performs quadrature detection on the signal received by the leaky cable 211 for reception on the basis of the sign wave generated by the sine wave generator 111. The quadrature detection is also called I/Q detection. In the quadrature detection, the received signal inputted from the leaky cable 211 is divided into an In-Phase component (referred to as an I component from here on) and a Quadrature component (referred to as a Q component from here on) with respect to a reference signal. Furthermore, in the quadrature detection, all sine wave signal components are removed from the received signal and a baseband component is outputted.

A low pass filter (LPF) not shown is disposed as an output stage of the quadrature demodulation unit 123 so that components lying within a high frequency band are removed from the output of the quadrature demodulation unit 123, and therefore only a needed component lying within a low frequency band (i.e., the baseband component) can be outputted. Furthermore, the quadrature demodulation unit 123 is provided with an A/D converter not shown and is so constructed as to output an I component and a Q component which are analog-to-digital converted baseband components.

The storage unit 130 holds signal data outputted from the signal receiving means 120, and also holds processed data from the measurement means 141, calculating means, and approach determining means 143 of the control unit 140. The details of these data will be mentioned later.

The control unit 140 consists of a CPU, a memory, and so on, and manages the control of each component in the sensor 100. When a plurality of electric waves in different frequency bands are sequentially transmitted from the leaky cable 201 and are then reflected by a target 400, the measurement means 141 outputs measurement information including both the signal intensities and phases of the plurality of reflected electric waves in different frequency bands received by the leaky cable 211, and propagation delay times which have elapsed until they are received since they have been transmitted on the basis of the plurality of electric waves in different frequency bands. The calculating means 142 groups the measurement information by target 400 on the basis of the information about the signal intensities and phases of the plurality of reflected electric waves in different frequency bands, which is included in the measurement information outputted from the measurement means 141, and calculates both the position of the target (i.e., a distance in the longitudinal direction of the electric wave transmit/receive means 200) Z with respect to the longitudinal direction of the electric wave transmit/receive means 200 and the distance R between the target 400 and the electric wave transmit/receive means 200 on the basis of the grouped measurement information.

The approach determining means 143 determines whether or not the target 400 is approaching to a specific alarming area on the basis of both the results calculated by the calculating means 142 and predetermined information about the specific alarming area, and outputs approach information including information indicating whether or not each target 400 is approaching to the specific alarming area, the position Z, and the distance R to the alarm unit 300. These measurement means 141, calculating means 142, and approach determining means 143 are implemented via pieces of software respectively corresponding to their functions, and hardware including a CPU and a memory which execute the pieces of software.

Figure 2:
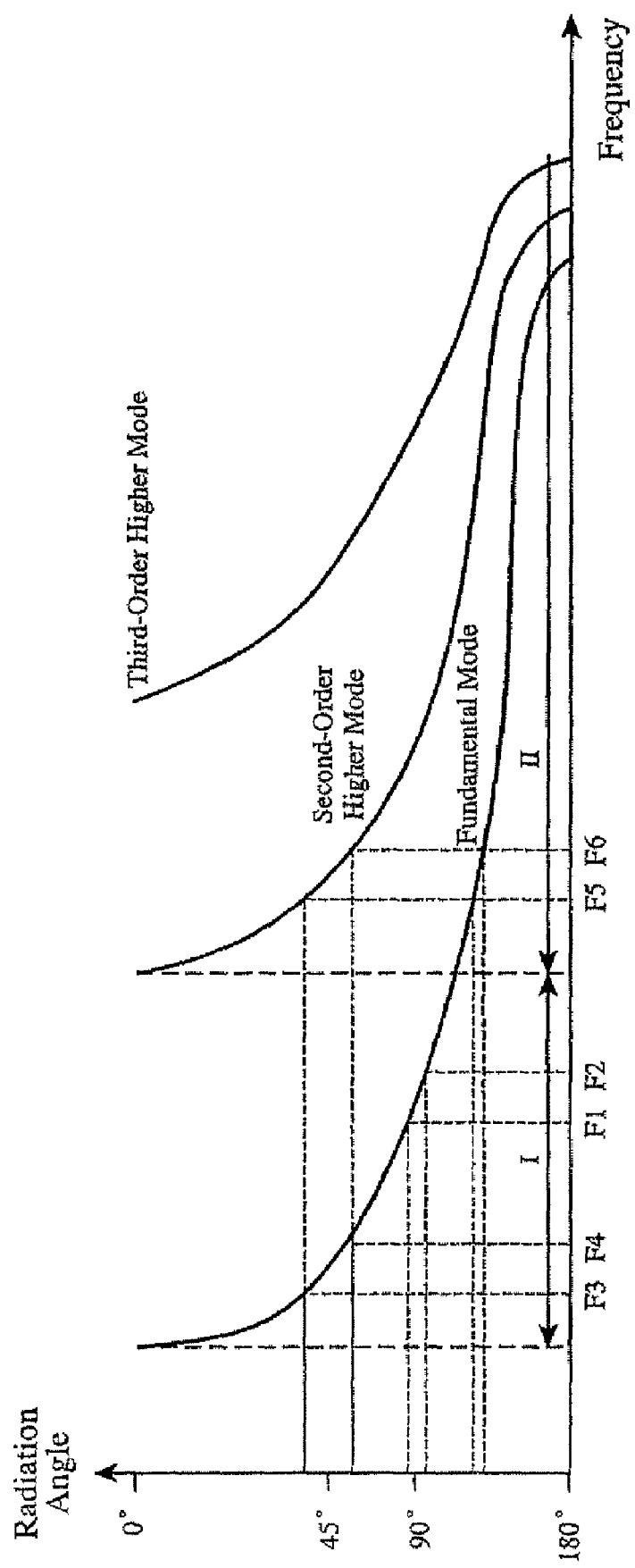
FIG. 2 is an explanatory diagram showing the radiation directivity characteristics of a leaky cable of the approach detecting system in accordance with embodiment 1 of the present invention.

In the electric wave transmit/receive means 200, the leaky cables 201 and 211 serve as cable-shaped electric wave transmitting means and cable-shaped electric wave receiving means having radiation directivity which varies with frequency, respectively. A leaky coaxial cable (LCX) or a leaky waveguide can be used as each of these leaky cables 201 and 211, for example. Any of a leaky coaxial cable and a leaky waveguide leaks an electric wave with slots which are formed in an outer jacket conductor thereof. At this time, radiation directivity appears according to the pitch of the slots, and the electric wave has a radiation angle which depends on its frequency. A relation between the frequency and the radiation directivity is shown in FIG. 2. A fundamental mode and higher modes shown in FIG. 2 will be explained later in detail.

Each of the coaxial cables 202 and 212 constitutes a signal transmission line for connecting the sensor 100 with the electric wave transmit/receive means 200. The terminal units 203 and 213 are connected to ends (referred to as far ends from here on) of the leaky cables 201 and 211 which are opposite to the other ends of the leaky cables connected, via the coaxial cables, to the sensor 100, respectively, and absorb signals from these leaky cables 201 and 211. In other words, a signal inputted to the leaky cable 201 from the coaxial cable 202 is transmitted, as an electric wave, to a neighboring space from this leaky cable 201, and a remaining signal which is not transmitted to the space is absorbed by the terminal unit 203.

The electric wave transmitted from the leaky cable 201 is reflected by the target 400, and a reflected wave which is the reflected electric wave is received by the leaky cable 211. Typically, the leaky cable 211 is arranged in substantially parallel with the leaky cable 201. However, the leaky cable 211 does not need to be arranged in completely parallel with the leaky cable 201, and the gap between them can be partially widened or narrowed. However, the gap between the leaky cable 201 and the leaky cable 211 has to be narrowed compared with the distance measurement accuracy which is determined by the frequency bandwidth used for observation. In a case in which the gap between the leaky cable 201 and the leaky cable 211 is wider than the distance measurement accuracy, the position Z of the target 400 with respect to the longitudinal direction of the electric wave transmit/receive means 200, which consists of the "cable-shaped electric wave transmitting means" and the "cable-shaped electric wave receiving means", and the distance R between the target 400 and the electric wave transmit/receive means 200 cannot be determined with a high degree of accuracy. For example, when the frequency bandwidth used for observation is 10 MHz, since the distance measurement accuracy is given by (the velocity of light/(2×bandwidth)) and is therefore $3 \times 10^8/(2 \times 10 \times 10^6)=15$ m, the gap between the leaky cable 201 and the leaky cable 211 has to be narrower than this distance measurement accuracy.

The terminal unit 213 connected to the far end of the leaky cable 211 absorbs a signal component which propagates toward the terminal unit 213 of the signal received by the leaky cable 211. A signal component which propagates toward the sensor 100 side of the signal received by the leaky cable 211 passes through the coaxial cable 212 and is then inputted to the signal receiving means 120.

The alarm unit 300 is provided with, for example, a display means, such as a display, and a voice output means, such as a speaker, generates an audible alarm on the basis of the approach information outputted from the approach determining means 143, and displays the position Z and distance R indicating the position of the target 400 which is approaching toward the electric wave transmit/receive means 200.

Figure 3:
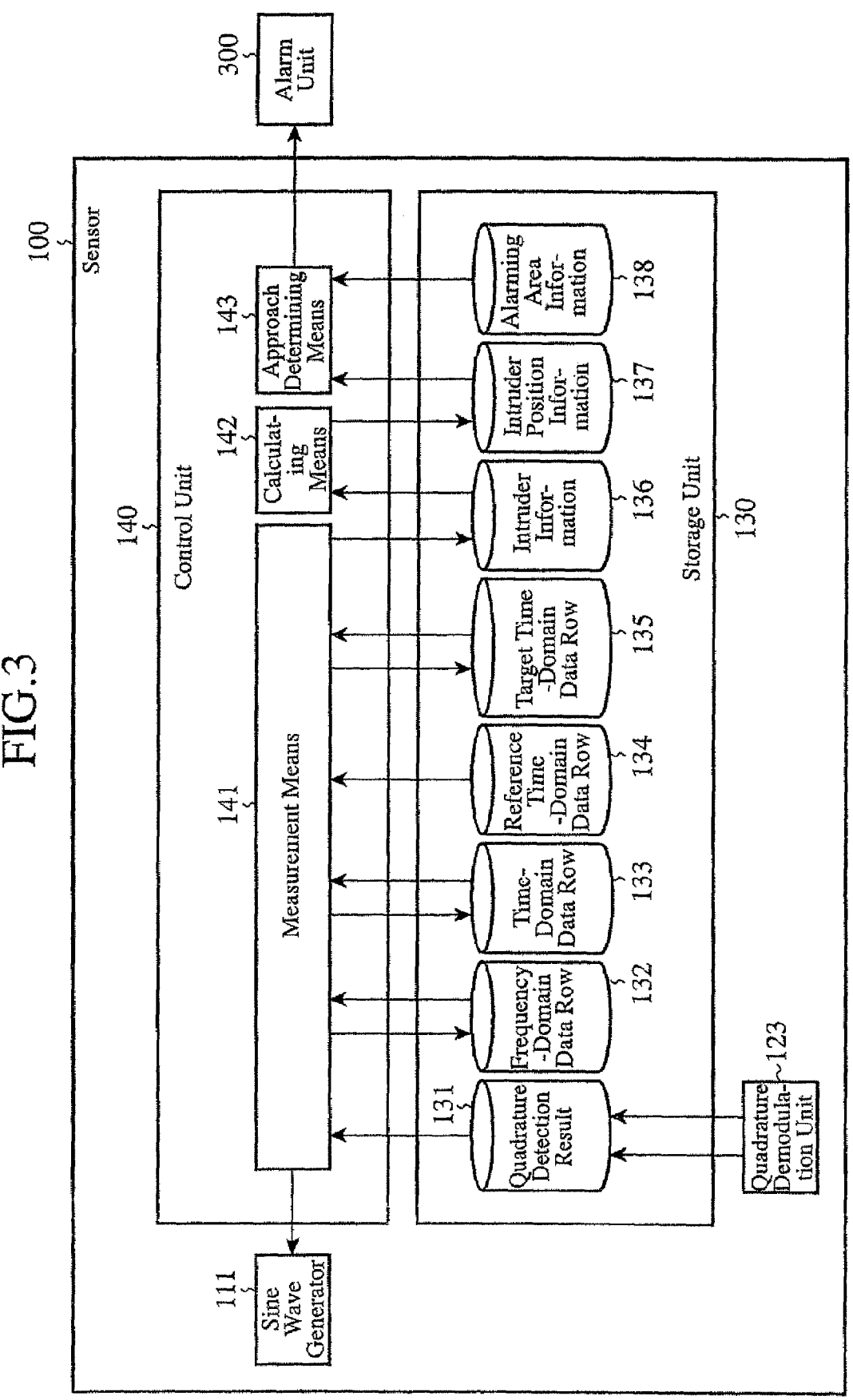
FIG. 3 is an explanatory diagram showing a relation between data stored in a storage unit and a control unit in the approach detecting system in accordance with embodiment 1 of the present invention.

Next, the operation of the approach detection system in accordance with this embodiment of the present invention will be explained. First, data stored in the storage unit 130 will be explained. FIG. 3 is an explanatory diagram showing a relation between the data stored in the storage unit 130 and each means disposed in the control unit 140. The I component and Q component which are outputs of the quadrature demodulation unit 123 of the signal receiving means 120 are stored, as quadrature detection results 131, in the storage unit 130, as shown in FIG. 3. The measurement means 141 refers to the quadrature detection results 131, i.e., the I component and Q component, and outputs intruder information 136. The measurement means 141 carries out the processing as follows.

The intruder information 136 includes the amplitude of the signal which is the reflected wave reflected from the target 400 which is approaching to the electric wave transmit/receive means 200, and the propagation delay time which has elapsed until the reflected wave is received since the corresponding electric wave has been transmitted. Methods of implementing the measurement of the intruder information include a pulse method, an FM-CW method, and a spectrum spread method for use in UWB (ultra wideband). Hereafter, a method of implementing the measurement of the intruder information using a frequency chirp method will be explained.

The measurement means 141 sets an oscillating frequency for the sine wave generator 111 of the signal generation means 110, and stores quadrature detection results 131 observed at this time in a frequency-domain data row 132 of the storage unit 130. After that, the measurement means 141 changes the set oscillating frequency gradually, and arranges and stores subsequently-obtained quadrature detection results 131 in the storage unit 130 so that they are aligned in a row in the storage unit. As a result, the frequency-domain data row 132 which is the series of the quadrature detection results 131 associated with different frequencies is stored in the storage unit 130. This frequency-domain data row 132 is the series of I components and Q components. From the viewpoint of numerical calculations, each I component is treated as a real number and each Q component is treated as an imaginary number. Therefore, this frequency-domain data row 132 is treated as a complex number and is inverse-Fourier-transformed into a time-domain data row 133. The time-domain data row 133 acquired through the inverse Fourier transformation is then stored in the storage unit 130. This time-domain data row 133 corresponds to an impulse response which is received when a so-called pulse wave is sent out, and includes information about the electric wave reflected by the target 400. Therefore, in order to acquire the information about the electric wave reflected by the target 400, the difference between the time-domain data row 133 and a time-domain data row which is acquired in advance in an initial state without any target 400 is calculated.

The reference time-domain data row 134 in the initial state which is thus acquired in advance is stored in the storage unit 130. The measurement means 141 acquires a target time-domain data row 135 by calculating the difference between the time-domain data row 133 and the reference time-domain data row 134. In this target time-domain data row 135, a peak appears at a time corresponding to the propagation delay time which has elapsed since the signal generation means 110 outputted a corresponding signal until this signal is received by the signal receiving means 120. In other words, in a case in which the electric wave transmit/receive means 200 sends out a pulse wave, an electric waveform in which the pulse wave which has hit the target 400 returns with a time delay appears in the target time-domain data row 135. When a plurality of targets 400 are approaching, peaks respectively corresponding to the plurality of target 400 appear in the target time-domain data row 135. Therefore, all peaks having amplitudes exceeding a predetermined threshold are extracted from the target time-domain data row 135, and the amplitude which is the size of each peak, and the phase and propagation delay time of each peak are determined from the target time-domain data row 135.

The measurement means 141 acquires a frequency-domain data row 132 while setting up an oscillating frequency for the sine wave generator 111 of the signal generation means 110, and also carries out the above-mentioned process of acquiring the propagation delay time which has elapsed since a corresponding electric wave was outputted until this electric wave is received and the amplitude of the received electric wave for another frequency range. As a result, the measurement means 141 acquires two sets of the amplitude, phase, and propagation delay time of each peak, and outputs the intruder information 136 which consists of the two sets of the amplitude, phase, and propagation delay time of each peak to the storage unit 130.

Figure 4:
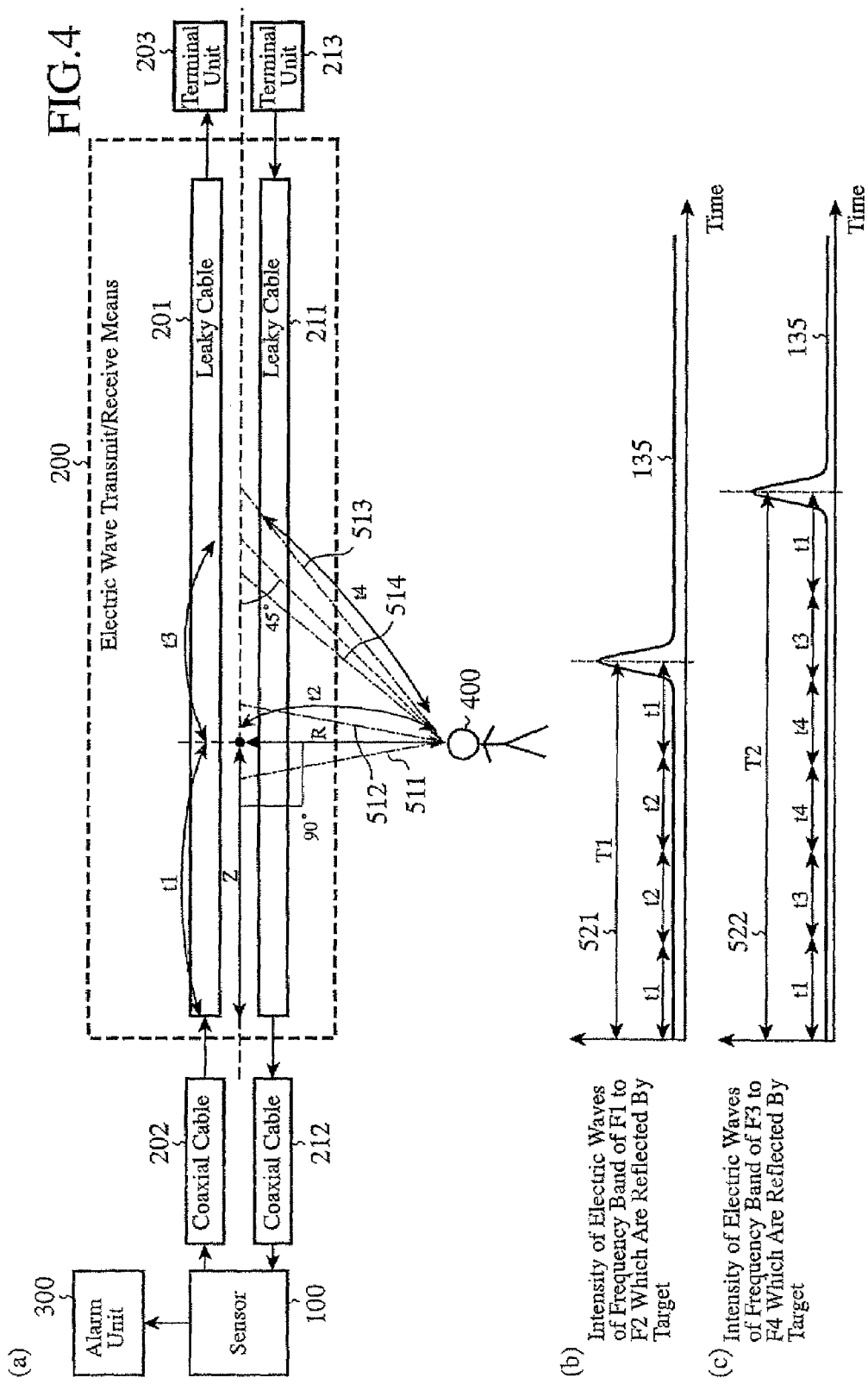
FIG. 4 is an explanatory diagram showing the principle of operation of the approach detecting system in accordance with embodiment 1 of the present invention.

The meaning of this operation will be explained with reference to FIGS. 4(*a*), 4(*b*), and 4(*c*). Each of the leaky cables 201 and 211 has characteristics of its radiation directivity varying with frequency. Therefore, as shown in FIG. 4(*a*), two frequencies F1 and F2 are chosen so that one half of the sum of a radiation angle 511 at the frequency F1 and a radiation angle 512 at the frequency F2 becomes equal to 90 degrees. When electric waves in the frequency range of from F1 to F2 are sequentially transmitted, the measurement means 141 acquires a target time-domain data row 135 and then acquires a propagation delay time 521 from this target time-domain data row. Furthermore, two frequencies F3 and F4 are chosen so that one half of the sum of a radiation angle 513 for the frequency F3 and a radiation angle 514 for the frequency F4 becomes equal to 45 degrees. When electric waves in the frequency range of from F3 to F4 are sequentially transmitted, the measurement means 141 also acquires a target time-domain data row 135 and then acquires a propagation delay time 522 from this target time-domain data row. As shown in FIG. 4(*b*), the propagation delay time 521 is given by the following equation:

$$T1=2\times(t1+t2) \quad (1)$$

As shown in FIG. 4(*c*), the propagation delay time 522 is given by the following equation:

$$T2=2\times(t1+t3+t4) \quad (2)$$

In each of FIGS. 4(*b*) and (*c*), the wave-shaped peak in the target time-domain data row 135 shows the reflected electric wave.

Since the dielectric constant of each of the leaky cables 201 and 211 differs from that of air, the velocity of a electric wave traveling through each of the leaky cables 201 and 211 becomes low and the wavelength of the electric wave becomes short. The rate of the shortening of the wavelength is called the shortening coefficient of wavelength (referred to as K from here on) Furthermore, the electric length becomes long by only (1/shortening coefficient of wavelength) as the velocity of the electric wave becomes low. When these points are taken into consideration, the following equations are derived from FIGS. 4(*a*), 4(*b*), and 4(*c*).

$$t2=t3/K \quad (3)$$

$$t2=t4\cos(45 \text{ degrees})=t4/\sqrt{2} \quad (4)$$

By solving these simultaneous equations, t1 and t2 are calculated. This calculation is carried out by the calculating means 142. When t1 and t2 are calculated, the position Z of the target 400 with respect to the longitudinal direction of the electric wave transmit/receive means 200, which consists of the cable-shaped electric wave transmitting means and the cable-shaped electric wave receiving means, and the distance R between the target 400 and the electric wave transmit/receive means 200 with respect to the position Z can be calculated.

Next, the frequency range of from F1 to F2 and the frequency range of from F3 to F4 will be explained. In general, the wider frequency range the electric waves sequentially emitted out of the cable-shaped electric wave transmitting means has, the shaper impulse response the detected time-domain waveform has. Therefore, the accuracy of measurement of the distance to the target can be improved. However, since the leaky cables are used as the electric wave transmit/receive means 200, as the frequency range of the electric waves is widened, the range of radiation angles is widened. Therefore, the target's image gets blurred conversely. As shown in a range "II" of FIG. 2, in the case in which the electric waves sequentially emitted out of the leaky cable have a high frequency range, a plurality of higher modes having different directivities exist. In this case, the sizes of all elements in the target time-domain data row 135 are sequentially examined in the order in which they appear in the target time-domain data row with time, and the peak which appears first can be assumed to be a target for the calculation processing. When electric waves are emitted out in two or more directions, two or more peaks exist per target, and therefore the calculation processing cannot be carried out properly. Therefore, from a frequency band in which only one radiation direction is allowed, i.e., from a range of "I" of FIG. 2, the frequency range of from F1 to F2 and the frequency range of from F3 to F4 are chosen. In the present invention, the range of "I" of FIG. 2 is referred to as the fundamental-mode region.

The frequency band in which only one radiation direction is allowed is given by the following inequality decided by both the pitch of the slots which are formed in the outer jacket conductor of the leaky coaxial cable or leaky waveguide, and the shortening coefficient of wavelength.

$$(1/K+1)/2 < \text{available frequencies/slot pitch} < 1/K+1$$

Because this inequality is already known, the explanation of how to derive the inequality will be omitted hereafter.

Now, in a case in which it is necessary to improve the accuracy of measurement of the position of each target, the difference between the two radiation angles is enlarged as much as possible. In the previously-explained example, 90 degrees and 45 degrees are chosen as the two radiation angles. When a target 400 enters an area in the vicinity of the far ends of the leaky cables with the two radiation angles being chosen, the accuracy of measurement of the position of the target degrades remarkably. This is because the leaky cables 201 and 211 do not further extend for a long length in the vicinity of the far ends thereof, and therefore the electric wave radiated at the radiation angle of 45 degrees becomes weak. As a method of avoiding this problem, there is a method of making observations and measurements using a combination of two radiation angles of 135 degrees and 90 degrees in the vicinity of the far ends of the leaky cables 201 and 211. That is, by making observations and measurements by changing the combination of the two frequency ranges, the position of any target 400 staying in an area in the vicinity of the far ends of the leaky cables 201 and 211 can be measured without reduction in the accuracy of measurement.

By the way, the above-mentioned range of available frequencies is not managed so strictly for general-purpose leaky coaxial cables. This is because a general-purpose leaky coaxial cable is mainly intended for broadcasting, and therefore electric waves have only to be emitted out around the leaky coaxial cable. In contrast, in the measurement of the position of a target, at which the present invention is aimed, the precision of each radiation direction and the number of the radiation directions serve as important factors.

Figure 5:
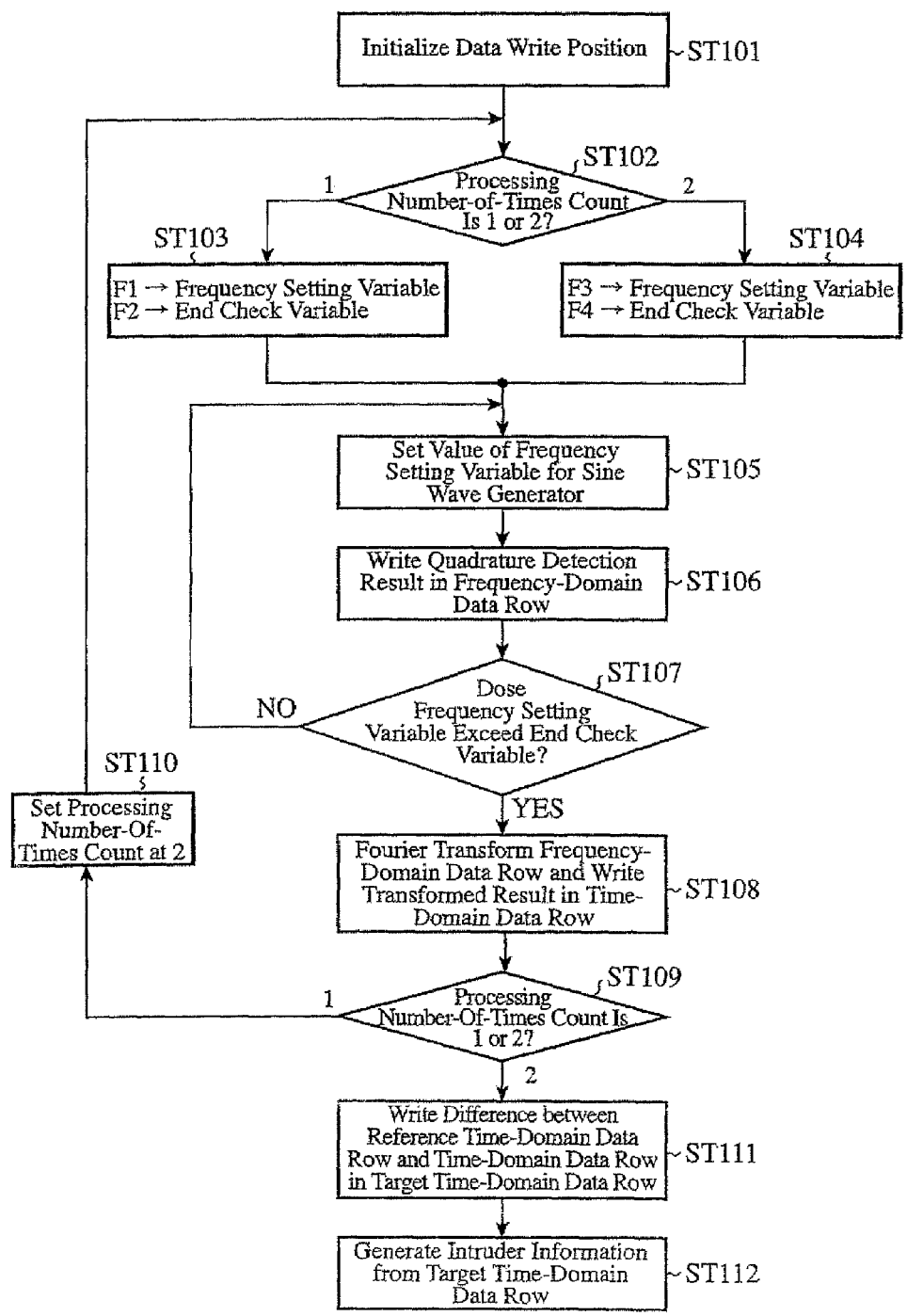
FIG. 5 is a flow chart showing the operation of a measurement means of the approach detecting system in accordance with embodiment 1 of the present invention.

Next, concrete measurement processing done by the measurement means 141 will be explained. FIG. 5 is a flow chart showing an example of the operation of the measurement means 141. First, the measurement means 141 initializes a count indicating the number of times that the processing is performed, and the write position of the frequency-domain data row 132 and the write position of the time-domain data row 133 (in step ST101. The measurement means 141 then checks the count indicating the number of times that the processing is performed, and, when the current processing is the first-time one, shifts to step ST103, whereas the current processing is the second-time one, shifts to step ST104. In step ST103, the measurement means 141 assigns the frequency F1 to a frequency setting variable, and assigns the frequency F2 to an end check variable, and then shifts to step ST105. In step ST104, the measurement means 141 assigns the frequency F3 to the frequency setting variable, and assigns the frequency F4 to the end check variable, and then shifts to step ST105.

In step ST105, the measurement means 141 sets the value of the frequency setting variable for the sine wave generator 111 of the signal generation means 110. After the setting, the measurement means 141 updates the value of the frequency setting variable for the next setting so that it is shifted by a little bit toward the value of the end check variable. The measurement means 141 then waits for an update of the quadrature detection results 131 in the storage unit 130, and, when they are updated, writes the updated quadrature detection results 131 in the frequency-domain data row 132 (in step ST106). Assume that the I component is a real part, and the Q component is an imaginary part. After the writing of the updated quadrature detection results, the measurement means 141 updates the next write position.

The measurement means 141 then, in step ST107, checks to see whether the frequency setting variable exceeds the end check variable, and, when the frequency setting variable does not exceed the end check variable, returns to step ST105, or advances to step ST108 otherwise. In step ST105, the measurement means 141 performs a Fourier transformation on the frequency-domain data row 132, and writes the Fourier-transformed result in the time-domain data row 133. After the writing of the Fourier-transformed result, the measurement means 141 initializes the write position of the frequency-domain data row 132 and the write position of the time-domain data row 133 to positions distinguishable for each time of processing for the next processing.

The measurement means 141 then, in step ST109, examines the count indicating the number of times that the processing is performed, and, when the count is 1, increments the count by 1 (in step ST110), and returns to step ST102, whereas, when the count is 2, shifts to step ST111. The measurement means 141, in step ST111, calculates the difference between the reference time-domain data row 134, which is acquired in advance, and the time-domain data row 133 and writes the difference in the target time-domain data row 135. Each of the reference time-domain data row 134 and time-domain data row 133 includes two sets of data row corresponding to the first frequency range of from F1 to F2 and the second frequency range of from F3 to F4. Therefore, the measurement means 141 calculates the difference for each of the two sets of data row, and acquires two sets of target time-domain data row 135.

The measurement means 141 then, in step ST112, extracts all peaks each having a level exceeding a predetermined threshold from each of the two sets of target time-domain data row 135, further extracts the amplitude of each peak which is the level of each peak, and the phase and propagation delay time of each peak, and outputs them, as intruder information 136, to the storage unit 130. Thus, two sets of intruder information 136 are generated. The approach detecting system then finishes the processing by the measurement means 141, and moves to processing by the calculating means 142.

As mentioned above, the calculating means 142 groups the intruder information 136 about the target 400 by target 400, and calculates the position Z of the target 400 with respect to the longitudinal direction of the electric wave transmit/receive means 200, and the distance R between the target 400 and the electric wave transmit/receive means 200 with respect to the position Z on the basis of the measurement information which is grouped by target. In a case in which two or more targets 400 are approaching to the approach detecting system, the calculating means 142 needs to select two pieces of information for each of the two or more targets 400 from the two sets of intruder information 136, respectively, and combine them. For example, when two targets 400 are approaching to the approach detecting system, each of the two sets of intruder information 136 includes two pieces of information about the two targets. Therefore, it is necessary to extract a combination of two pieces of intruder information about each target from the above-mentioned two sets of intruder information 136 extracted by the measurement means 141, and, if this combination is extracted incorrectly, the position of each target will be determined incorrectly, As this method of extracting a combination of two pieces of intruder information about each target from the two sets of intruder information 136, there is a method of using the amplitude information included in the intruder information 136. In accordance with this method, two pieces of information which represent amplitude values close to each other are combined for each target. In a case in which each target is close to the leaky cables, the amplitude of the reflected wave in the first frequency range of from F1 to F2 is close to that of the reflected wave in the second frequency range of from F3 to F4. However, the difference between the two amplitudes increases with increase in the distance between each target and the leaky cables. Therefore, when two or more targets are staying at various distances from the leaky cables, there is a risk that the combination of two pieces of intruder information about each target is determined incorrectly. However, in the case in which each target is close to the leaky cables, not only the amplitude of the reflected wave in the first frequency range of from F1 to F2 is close to that of the reflected wave in the second frequency range of from F3 to F4, but the propagation delay time associated with the first frequency range of from F1 to F2 is much the same as that associated with the second frequency range of from F3 to F4. Therefore, by combining two pieces of intruder information which not only represent amplitude values close to each other, but represent propagation delay times close to each other for each target, the precision of the combination can be improved, and no problem associated with the combination of two pieces of intruder information about each target arises in the approach detecting system.

Figure 6:
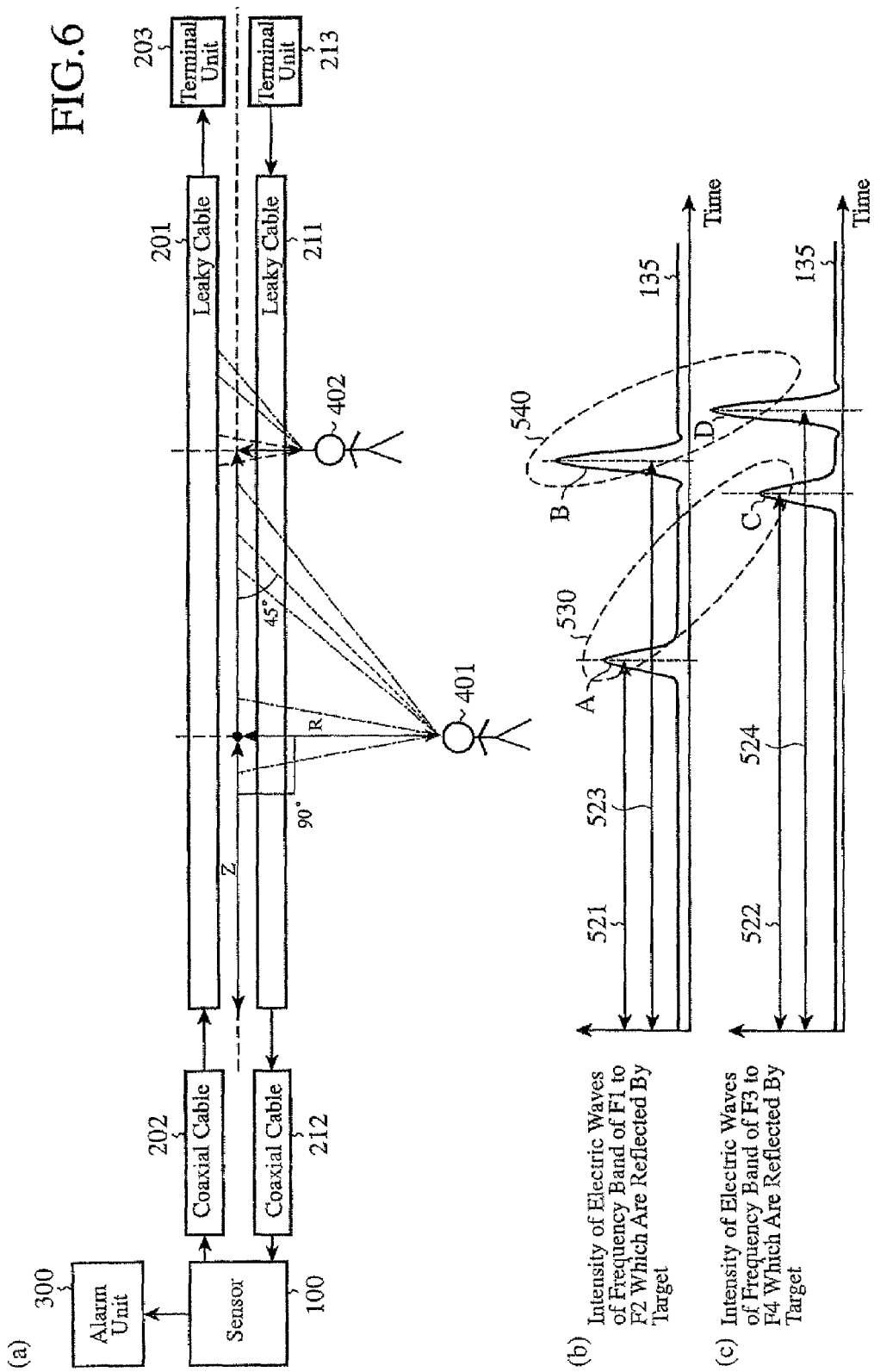
FIG. 6 is an explanatory diagram showing the principle of operation of the approach detecting system in accordance with embodiment 1 of the present invention in a case in which two or more targets are staying.

In order to improve the precision of the combination, time-varying variations in the amplitude and phase can be used. Although the use of the time-differentiated amplitude and phase can be mentioned as a simple example, a method of conducting a frequency analysis of a timing at which each received signal varies or time-varying variations in the amplitude and phase through a Fourier transformation or the like is effective. FIG. 6 is a diagram explaining an observation status of two targets, and shows an observation status of targets 401 and 402. In an observation of electric waves lying within the frequency range of from F1 to F2, two reflected waves: a reflected wave A and a reflected wave B are detected as the target time-domain data row 135 (see FIG. 6(b)). Similarly, in an observation of electric waves lying within the frequency range of from F3 to F4, two reflected waves: a reflected wave C and a reflected wave D are detected as the target time-domain data row 135 (see FIG. 6(c)). Next, the propagation delay time 521 of the reflected wave A, the propagation delay time 523 of the reflected wave B, the propagation delay time 522 of the reflected wave C, and the propagation delay time 524 of the reflected wave D are grouped into two combinations of propagation delay times respectively corresponding to the targets 401 and 402.

As an alternative, there is a method of grouping each of the reflected waves A and B, and the reflected waves C and D using their amplitudes, as previously explained. When a comparison between the amplitudes of the reflected waves A and B is made, it is clear that the following relation: the reflected wave A< the reflected wave B is established. Similarly, when a comparison between the amplitudes of the reflected waves C and D is made, it is clear that the following relation: the reflected wave C< the reflected wave D is established. Therefore, the reflected waves A, B, C, and D can be grouped into two groups: a group of (the reflected waves A and C), and another group of (the reflected waves B and D) (see dashed line portions 530 and 540 FIGS. 6(b) and 6(c)).

However, because there is a possibility that the grouping using only the amplitudes of the reflected electric waves results in incorrect combinations of reflected electric waves, the timing at which each received signal varies can be also used. FIGS. 7(a) to 7(d) are explanatory diagrams showing the time history of the intensity of the reflected wave observed at each propagation delay time. FIGS. 7(a) to 7(d) show the waveforms of the reflected waves A to D, respectively. It is clear from FIGS. 7(a) to 7(d) that the reflected wave A shown in FIG. 7(a) and reflected wave C shown in FIG. 7(c) rise simultaneously, i.e., variations simultaneously occur in these signals, and the reflected wave B shown in FIG. 7(b) and reflected wave D shown in FIG. 7(d) rise simultaneously, i.e., variations simultaneously occur in these signals. Therefore, the reflected waves A, B, C, and D can be grouped into two groups: a group of (the reflected waves A and C), and another group of (the reflected waves B and D). During a time period during which the reflected waves A and C has risen and their amplitudes are held at a nearly maximum, the reflected waves A and C vary finely in amplitude. In contrast, during a time period during which the reflected waves B and C has risen and their amplitudes are held at a nearly maximum, the reflected waves A and C vary largely and gradually in amplitude. This difference can be easily detected by conducting a frequency analysis on the frequency of variations in the amplitude of each reflected wave during the time period. As a result, by combining any two signals which have a similar frequency of variations in their amplitudes, the reflected waves can be grouped into two combinations of reflected waves. Thus, using either the grouping based on the rising timing of each peak or the method of conducting a frequency analysis on the frequency of variations in the amplitude of each reflected wave, and combining any two signals which have a similar frequency of variations in their amplitudes, extraction of a combination of reflected waves for each target can be carried out with a high degree of accuracy.

After making a combination of reflected waves for each target using the above explained grouping method, the calculating means 142 acquires the propagation delay times T1 and T2 associated with each target 400 (in the case shown in FIG. 4). The calculating means 142 then calculates the position of each target 400 from these propagation delay times T1 and T2. In this calculation, the calculating means 142 acquires t1 and t2 using the following equations (5) and (6) which are acquired by solving the simultaneous equations (1) to (4) explained previously.

$$t1 = T1/2 - (T2-T1)/(2 \times (K+\sqrt{2}-1)) \quad (5)$$

$$t2 = (T2-T1)/(2 \times (K+\sqrt{2}-1)) \quad (6)$$

In these equations, T1 is the propagation delay time which is acquired from the reflected wave in the frequency range of from F1 to F2 and which is stored in the first field of the intruder information 136, and T2 is the propagation delay time which is acquired from the reflected wave in the frequency range of from F3 to F4 and which is stored in the second field of the intruder information 136. t1 is the time required for the signal to propagate the distance between the end of the electric wave transmit/receive means 200 on the sensor 100's side thereof and a point of intersection where a perpendicular extending from each target 400 to the electric wave transmit/receive means 200 intersects the electric wave transmit/receive means, as shown in FIG. 4(a), i.e., the distance between the end of the electric wave transmit/receive means 200 and the position Z of each target with respect to the longitudinal direction of the electric wave transmit/receive means 200, and t2 is the time required for the signal to propagate the distance between the above-mentioned point of intersection and each target 400, i.e., the distance R between the electric wave transmit/receive means 200 and each target 400.

The calculating means 142 then calculates the position Z and distance R from t1 and t2 using the following equations (7) and (8):

$$Z = t1 \times K \times C \quad (7)$$

$$R = t2 \times C \quad (8)$$

where C is the velocity of light ($=3 \times 10^8$ m/s).

The calculating means 142 thus carries out the calculations, and outputs intruder position information 137 including the position Z and distance R associated with each target to the storage unit 130.

Next, the operation of the approach determining means 143 will be explained. As mentioned above, the approach determining means 143 detects an approach of each target 400 using the intruder position information 137. The approach determining means can detect an approach of each target 400 by determining whether the position Z and distance R associated with each target 400 are included in a range of positions and a range of distances which are defined in advance by alarming area information 138 stored in the storage unit 130. In order to detect all targets which are approaching to an area at a certain distance or shorter from the electric wave transmit/receive means 200, a threshold for the distance R only has to be incorporated into the alarming area information 138. In contrast, in a case in which a specific area, such as an entry way, where approach and passage of any authorized person are allowed is set up as the alarming area, the range of positions Z and the range of distances R have only to be specified finely. It is also possible to change the alarming area depending on whether the current time is daytime or night by combining a clock with the setting of the range of positions Z and the range of distances R. When a target 400 intrudes the alarming area specified by the alarming area information 138, the approach determining means 143 outputs, as approach information, information indicating the approach of the target, and the position Z and distance R associated with the target to the alarm unit 300. When knowing the approach of the target from the approach information, the alarm unit 300 generates a predetermined audible alarm and displays the position z indicating the position of the approaching target, and the distance R from the system.

By the way, it is desirable to variously change the combination of the transmit frequencies F1, F2, F3, and F4, to observe the reflected waves. This is because, as previously explained, in the case in which 90 degrees and 45 degrees are chosen as the two radiation angles, when a target 400 enters an area in the vicinity of the far ends of the leaky cables with the two radiation angles being chosen, the accuracy of measurement of the position of the target degrades remarkably.

In a case in which the frequency of the electric wave emitted out of the electric wave transmit/receive means 200 is changed and therefore the radiation direction is changed, the following equation is used instead of the equations (5) and (6).

$$t1 = \frac{T1}{2} - \frac{(T2-T1)\left(\frac{k}{\tan\theta 1} + \frac{1}{\sin\theta 1}\right)}{2\left\{\left(\frac{1}{\tan\theta 2} - \frac{1}{\tan\theta 1}\right)K + \frac{1}{\sin\theta 2} - \frac{1}{\sin\theta 1}\right\}} \quad (9)$$

$$t2 = \frac{T2-T1}{2\left\{\left(\frac{1}{\tan\theta 2} - \frac{1}{\tan\theta 1}\right)K + \frac{1}{\sin\theta 2} - \frac{1}{\sin\theta 1}\right\}} \quad (10)$$

In a case that $\theta 1 = \pi/2$ and $\theta 2 = \pi/4$, the equation (9) is equivalent to the equation (5), and the equation (10) is equivalent to the equation (6). Furthermore, by changing the combination of transmit frequencies at all times, even if some transmit frequencies cannot be used due to electromagnetic interference etc., an observation with other transmit frequencies can be carried out. Therefore, the approach detecting system in accordance with the present invention is immune from electromagnetic interference, and its value as a security system is improved. Also when a target 400 is staying in an area in the vicinity of the far ends of the leaky cables 201 and 211, the measurement of the target 400 can be performed without reduction in the accuracy of measurement.

There is a method of fundamentally solving the above-mentioned problem which may arise in the case of combining two or more peaks which appear in each of the two sets of intruder information 136 when observing two or more targets for each target by changing the combination of transmit frequencies. In accordance with this method, the two transmit frequencies of the first combination are initially made to be equal to or close to the two transmit frequencies of the second combination, respectively, and an observation of electric waves reflected from the two or more targets is continuously carried out while the difference between the first and second combinations is gradually increased. When such an observation of electric waves reflected from the two or more targets is continuously carried out after the initial setting has been made, two or more peaks respectively corresponding to the two or more targets initially appear at the same propagation delay time in each of the two sets of intruder information 136, and, after that, a difference occurs in the propagation delay times of two peaks respectively included in the two sets of intruder information 136, which correspond to each target, and the difference then increases gradually as the above-mentioned difference between the first and second combinations is gradually increased. As a result, there occurs no risk that a combination of two peaks is determined incorrectly for each target. In this case, the position of each target has only to be calculated when the above-mentioned difference between the first and second combinations is increased to such an extent that a needed degree of accuracy of measurement is acquired.

In a case in which it takes much time to gradually increase the difference between the first and second combinations, a frequency-domain data row is acquired throughout an adequately-wide range of frequencies, information associated with needed frequencies is extracted out of the frequency-domain data row, and subsequent processing is then carried out. In this case, a single measurement operation is all that is required to acquire a frequency-domain data row throughout an adequately-wide range of frequencies, and, after that, only a calculation operation is needed. Therefore, the position measurement can be carried out at a very high speed and with a high degree of accuracy.

In accordance with above-mentioned embodiment 1, the signal generation means, the signal receiving means, and the measurement means are so constructed as to use the frequency chirp method to measure the amplitude and propagation delay time of a electric wave reflected from each target. As an alternative, as the method of implementing the position measurement, a pulse method, an FM-CW method, or a spectrum spread method for use in UWB (ultra wideband) can be used. In this case, the frequency range of the spectrum of transmit frequencies needs to fall within a specific frequency range defined by a predetermined equation (specific frequency range falls within the fundamental-mode region).

As mentioned above, the approach detecting system in accordance with embodiment 1 includes: the electric wave transmit/receive means having the cable-shaped electric wave transmitting means having radiation directivity which varies with frequency, and the cable-shaped electric wave receiving means disposed in substantially parallel to the electric wave transmitting means, for receiving an electric wave transmitted thereto from the electric wave transmitting means; the measurement means for, when the electric wave receiving means receives a plurality of electric waves in different frequency bands which are transmitted from the electric wave transmitting means and are then reflected by each of one or more targets, for outputting measurement information including the signal intensity and phase of the reflected electric wave in each frequency band, and a propagation delay time which has elapsed until it is received since it has been transmitted on the basis of the plurality of electric waves in different frequency bands received by the electric wave receiving means; and the calculating means for grouping the measurement information by target on the basis of the signal intensities and phases of the plurality of reflected electric waves in different frequency bands, and for calculating a position of each of the one or more targets with respect to the longitudinal direction of the electric wave transmit/receive means and a distance between each of the one or more targets and the electric wave transmit/receive means on the basis of the measurement information grouped by target. Therefore, the approach detecting system in accordance with this embodiment can certainly detect an approach or existence of the target no matter what positional relationship the target has with the electric wave transmit/receive means, and, even if two or more targets are staying or approaching in or to a specific alarming area, can detect the position of each of them individually.

Furthermore, in the approach detecting system in accordance with embodiment 1, the frequency band of each electric wave transmitted from the electric wave transmitting means falls within the fundamental-mode region in which an electric wave is emitted out of the electric wave transmitting means toward a single radiation direction when a single signal is given to the electric wave transmitting means. Therefore, radiation of electric waves in two or more directions in a higher mode from the leaky cable can be prevented, and each target can be detected certainly and correctly.

In addition, the approach detecting system in accordance with embodiment 1 includes the alarm unit for issuing an alarm, and causes the alarm unit to issue an alarm when a target is staying in the predetermined alarming area. Therefore, even when a target intrudes the alarming area which is specified in advance, the approach detecting system can recognize the intrusion easily.

Embodiment 2

An approach detecting system in accordance with embodiment 2 uses a higher-mode region (which will be mentioned later) as each frequency range used for detection of an approach of a target.

The approach detecting system in accordance with embodiment 2 has the same structure as that of embodiment 1 in terms of drawings. Therefore, the approach detecting system in accordance with embodiment 2 will be explained with reference to FIGS. 1 to 4. A measurement means 141 in accordance with embodiment 2 differs from that of embodiment 1 in that it instructs a signal generation means 110 to generate a signal having a frequency falling within the higher-mode region of leaky cables 201 and 211. In other words, the measurement means 141 instructs the signal generation means 110 so that an electric wave emitted out of the leaky cable 201 has a frequency falling within a range of frequencies given by the following equation:

Available frequencies/slot pitch<(1/shortening coefficient of wavelength+1)/2

This frequency range corresponds to the region "II" shown in FIG. 2, and, when a frequency falling within this region is used, electric waves are emitted out of the leaky cable 201 in a plurality of directions. In the present invention, the region "II" shown in FIG. 2 is referred to as the higher-mode region. Because the above inequality is already known, the explanation of the details of the inequality will be omitted hereafter.

Because components included in a sensor 100 are the same as those of embodiment 1, the explanation of the components will be omitted hereafter.

Next, the operation of the approach detecting system in accordance with embodiment 2 will be explained. In this embodiment, an observation of each target 400 is carried out with only a single frequency range, and the position Z of each target 400 with respect to the longitudinal direction of an electric wave transmit/receive means 200, which consists of the cable-shaped electric wave transmitting means 201 and the cable-shaped electric wave receiving means 211, and the distance R between each target 400 and the electric wave transmit/receive means 200 are calculated.

Because the frequency band used for an observation of each target 400 is the region "II" shown in FIG. 2, when an appropriate frequency range of from F5 to F6 is selected from this region, each target 400 can be observed simultaneously at two corresponding angles with respect to the electric wave transmit/receive means 200. Therefore, the acquisition of a frequency-domain data row 132 has only to be performed by the measurement means 141 only once. Although the measurement means 141 acquires the frequency-domain data row 132 only once, two peaks appear in a target time-domain data row 135 which is acquired by calculating the difference between a reference time-domain data row 134 and a time-domain data row into which the frequency-domain data row 132 is Fourier-transformed. These peaks correspond to the observation results at the two angles, respectively. Therefore, these two peaks are measured and propagation delay times T1 and T2 are acquired, Hereafter, the operation of the measurement means 141 will be explained in detail.

FIG. 5 is a flow chart showing the operation of the measurement means 141. First, the measurement means 141, in step ST201, initializes a count indicating the write position of the frequency-domain data row 132 and the write position of the time-domain data row 133. The measurement means 141 also assigns the frequency F5 to a frequency setting variable, and assigns the frequency F6 to an end check variable. These frequencies F5 and F6 fall within the above-mentioned higher-mode region, as shown in FIG. 2.

The measurement means 141 then, in step ST202, sets the value of the frequency setting variable for a sine wave generator 111 of the signal generation means 110. After the setting, the measurement means 141 updates the value of the frequency setting variable for the next setting so that it is shifted by a little bit toward the value of the end check variable The measurement means 141 then, in step ST203, waits for an update of quadrature detection results 131 stored in a storage unit 130, and, when they are updated, writes the updated quadrature detection results 131 in the frequency-domain data row 132. Assume that the I component is a real part, and the Q component is an imaginary part. After the writing of the updated quadrature detection results, the measurement means 141 updates the next write position.

The measurement means 141 then, in step ST204, checks to see whether the frequency setting variable exceeds the end check variable, and, when the frequency setting variable does not exceed the end check variable, returns to step ST202, or advances to step ST205 otherwise. In step ST205, the measurement means 141 performs a Fourier transformation on the frequency-domain data row 132, and writes the Fourier-transformed result in the time-domain data row 133. The measurement means 141 then, in step ST206, calculates the difference between the reference time-domain data row 134, which is acquired in advance, and the time-domain data row 133 and writes the difference in the target time-domain data row 135.

The measurement means 141 then, in step ST207, searches through the amplitude which is the root square of the sum of the squares of the real part and imaginary part of each peak which appears in order of time in the target time-domain data row 135, for a peak having an amplitude which exceeds a predetermined threshold for the first time, and another peak having an amplitude which exceeds the predetermined threshold for a second time, and outputs, as intruder information 136, the time-stamp values of the peaks and amplitudes of the peaks at those times to the storage unit 130. Thus, two sets of intruder information 136 are generated. The approach detecting system then finishes the processing by the measurement means 141, and moves to processing by the calculating means 142.

The calculating means 142 determines times t1 and t2 according to predetermined equations, calculates the position Z and distance R associated with each target, and outputs the intruder position information 137. Because the radiation angles are not necessarily the same as those as explained in embodiment 1, the equations used in embodiment 1 cannot be necessarily used. However, no matter what radiation angle is set up, simultaneous equations can be established and solved and the equations (5) and (6) shown in embodiment 1 can be driven. When two different radiation angles corresponding to the first frequency are expressed as $\theta_1$ and $\theta_2$, the equations (5) and (6) correspond to the equations (9) and (10) mentioned in embodiment 1, respectively. In a case that $\theta_1=\pi/2$ and $\theta_2=\pi/4$, the equation (9) is equivalent to the equation (5), and the equation (10) is equivalent to the equation (6). The position Z and distance R associated with each target can be determined from t1 and t2 using the equations (7) and (8) shown in embodiment 1. The calculating means 142 carries out such calculations to output intruder position information 137 including the position Z and distance R associated with each target to the storage unit 130. The approach determining means 143 detects an approach of each target 400 using the intruder position information 137. Because an subsequent operation of the approach detecting system of this embodiment is the same as that of embodiment 1, the explanation of the subsequent operation of the approach detecting system will be omitted hereafter.

Figure 7:
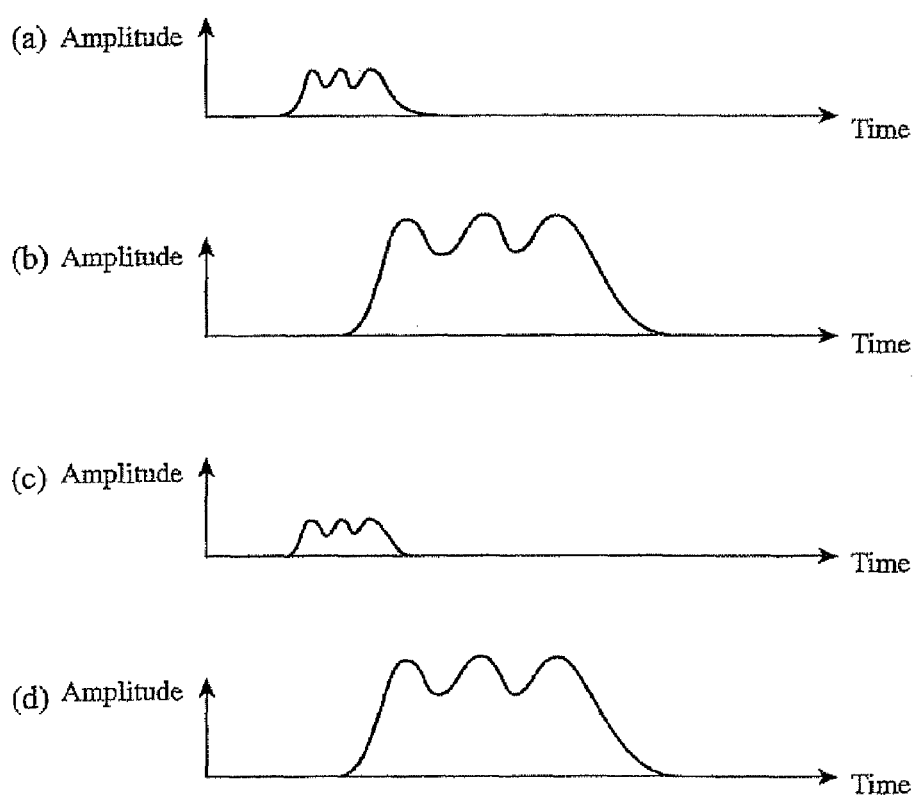
FIG. 7 is an explanatory diagram showing a time history of the strength of a reflected wave observed at each propagation delay time in the approach detecting system in accordance with embodiment 1 of the present invention.
Figure 8:
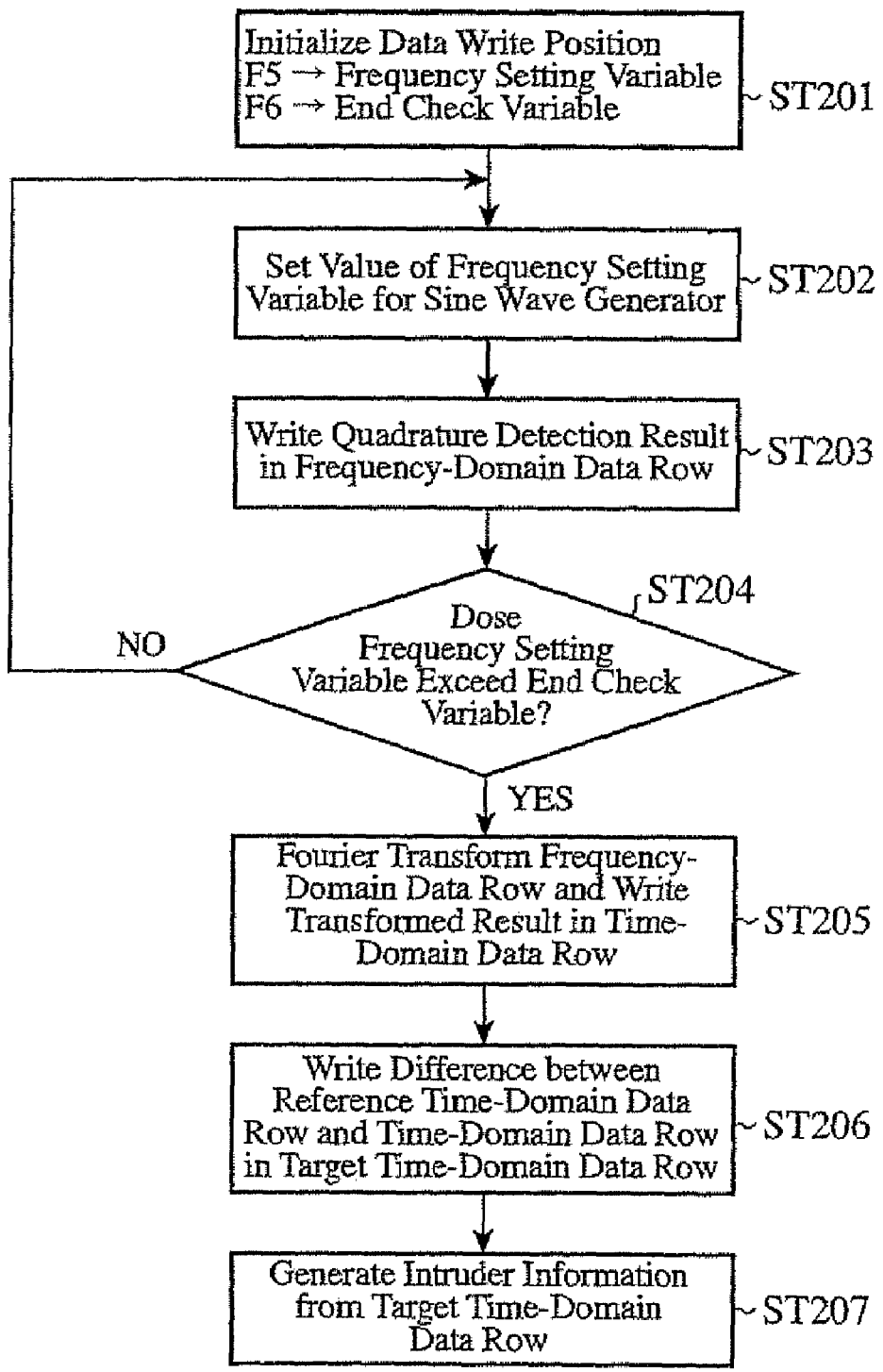
FIG. 8 is a flow chart showing the operation of a measurement means of an approach detecting system in accordance with embodiment 2 of the present invention.

Also in above-mentioned embodiment 2, when a plurality of targets 401 and 402 as shown by FIGS. 6 and 7 are staying in a specific alarming area, the calculating means 142 can detect the position of each of the plurality of targets 401 and 402 in the same manner that that of embodiment 1 does.

As mentioned above, in the approach detecting system in accordance with embodiment 2, the frequency bands of the plurality of electric waves transmitted from the electric wave transmitting means fall within the higher-mode region in which electric waves are emitted out of the electric wave transmitting means toward plural radiation directions when a single signal is given to the electric wave transmitting means. Therefore, because the approach detecting system in accordance with this embodiment can emit out electric waves toward each target from two or more directions with a single frequency range, the time required to measure the position of each target can be shortened.

Embodiment 3

An approach detecting system in accordance with embodiment 3 is provided with two or more sets of approach detecting systems each having the same structure as that of embodiment 1 or 2, and measures the three-dimensional position of a target 400.

Figure 9:
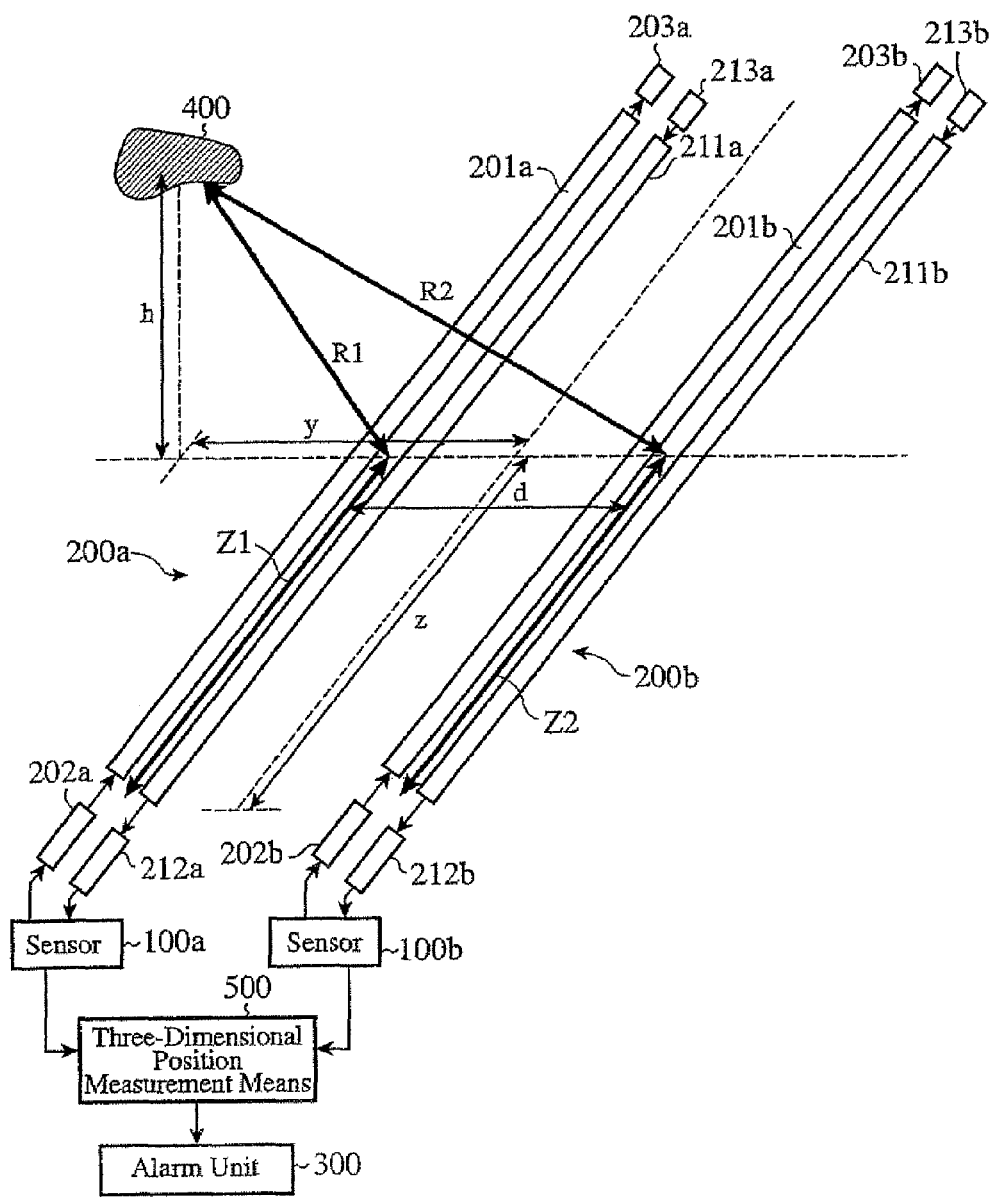
FIG. 9 is an explanatory diagram showing the structure and the principle of operation of an approach detecting system in accordance with embodiment 3 of the present invention.

FIG. 9 is an explanatory diagram showing the structure and the principle of operation of the approach detecting system in accordance with this embodiment 3. The approach detecting system of this embodiment 3 is provided with two sets of a sensor and an electric wave transmit/receive means. In other words, the approach detecting system of this embodiment 3 is provided with a set of a sensor 100a, coaxial cables 202a and 212a, leaky cables 201a and 211a, and terminal units 203a and 213a, and another set of a sensor 100b, coaxial cables 202b and 212b, leaky cables 201b and 211b, and terminal units 203b and 213b. Because the structures of the components included in each of the two sets are the same as those of the sensor 100, coaxial cables 202 and 212, leaky cables 201 and 211, and terminal units 203 and 213 of embodiment 1 or 2, the explanation of the structures of the components included in each of the two sets will be omitted hereafter. However, in the approach detecting system in accordance with embodiment 3, a three-dimensional position measurement means 500 is provided with components corresponding to the approach determining means 143 and alarming area information 138 of embodiment 1 or 2.

In this embodiment 3, the position of the target 400 with respect to the longitudinal direction of the electric wave transmit/receive means 200a is expressed as Z1 and the distance between the target 400 and the electric wave transmit/receive means 200a is expressed as R1, and the position of the target 400 with respect to the longitudinal direction of the electric wave transmit/receive means 200b is expressed as Z2 and the distance between the target 400 and the electric wave transmit/receive means 200b is expressed as R2.

The three-dimensional position measurement means 500 determines the three-dimensional position of the target 400 on the basis of the positions Z1 and Z2 of each target with respect to the longitudinal directions of the two electric wave transmit/receive means 200a and 200b which are obtained by the sensors 100a and 100b, respectively, and the distances R1 and R2 between each target and the two electric wave transmit/receive means 200a and 200b, as mentioned above, judges whether or not the target 400 is approaching to a specific alarming area on the basis of the three-dimensional position of each target, and outputs, as approach information, information indicating whether or not the target 400 is approaching to the specific alarming area, and the distances between the target 400 and the two electric wave transmit/receive means 200a and 200b to an alarm unit 300. The alarm unit 300 operates in the same way as shown in embodiment 1 or 2.

Next, the operation of the approach detecting system in accordance with embodiment 3 will be explained. A method of determining the positions Z1 and Z2 of a target 400 with respect to the longitudinal directions of the two electric wave transmit/receive means 200a and 200b, and the distances R1 and R2 between the target 400 and the two electric wave transmit/receive means 200a and 200b using the leaky cables 201a and 211a and the leaky cables 201b and 211b is the same as that of embodiment 1 or 2 of determining the position Z of a target with respect to the longitudinal direction of the electric wave transmit/receive means, and the distance R between the target and the electric wave transmit/receive means.

First approach information including information indicating whether or not there is an approach of a target, and the position Z1 and distance R1 associated with the target is inputted from the sensor 100a to the three-dimensional position measurement means 500, and second approach information including information indicating whether or not there is an approach of the target, and the position 52 and distance R2 associated with the target is inputted from the sensor 100b to the three-dimensional position measurement means 500. Thereby, the three-dimensional position measurement means 500 can measure the three-dimensional position of the target 400 from the positions Z1 and Z2, and distances R1 and R2 acquired as the first and second approach information on the basis of the arrangement of the leaky cables 201*a* and 211*a* and the leaky cables 201*b* and 211*b*.

For example, in a case in which the approach detecting system is so constructed as shown in FIG. 9, the approach detecting system can measure the three-dimensional position of the target using the following equations:

$$z = \frac{Z1 + Z2}{2} \tag{11}$$

$$y = \frac{R2^2 - R1^2}{2d} \tag{12}$$

$$h = \sqrt{R1^2 - \frac{(R2^2 - R1^2 - d^2)^2}{4d^2}} \tag{13}$$

where d is the gap between the electric wave transmit/receive means 200*a* and 200*b*.

After calculating the three-dimensional position of the target 400, the three-dimensional position measurement means 500 compares the calculated three-dimensional position coordinates z, y, and h with spatial values identifying the predetermined alarming area. When the three-dimensional position of the target enters this alarming area, the three-dimensional position measurement means 500 determines that the target is approaching, and outputs approach information including the three-dimensional position of the target 400 to the alarm unit 300. Thereby, the alarm unit 300 issues an alarm and displays the three-dimensional position of the target 400.

As mentioned above, the approach detecting system in accordance with embodiment 3 includes: plural sets of the electric wave transmit/receive means having the cable-shaped electric wave transmitting means having radiation directivity which varies with frequency, and the cable-shaped electric wave receiving means disposed in substantially parallel to the electric wave transmitting means, for receiving an electric wave transmitted thereto from the electric wave transmitting means, the measurement means for, when the electric wave receiving means receives a plurality of electric waves in different frequency bands which are transmitted from the electric wave transmitting means and are then reflected by each of one or more targets, for outputting measurement information including the signal intensity and phase of the reflected electric wave in each frequency band, and a propagation delay time which has elapsed until it is received since it has been transmitted on the basis of the plurality of electric waves in different frequency bands received by the electric wave receiving means, and the calculating means for grouping the measurement information by target on the basis of the signal intensities and phases of the plurality of reflected electric waves in different frequency bands, and for calculating a position of each of the one or more targets with respect to the longitudinal direction of the electric wave transmit/receive means and a distance between each of the one or more targets and the electric wave transmit/receive means on the basis of the measurement information grouped by target; and a three-dimensional position measurement means for measuring a three-dimensional position of each of the one or more targets on the basis of plural sets of the position and distance of each of the one or more targets which are acquired by the plural sets of electric wave transmit/receive means, measurement means, and calculating means. Therefore, the approach detecting system can measure the three-dimensional position of the target. Thereby, a three-dimensional alarming area can be set up finely, for example. The approach detecting system can further determine whether the target is intruding the alarming area from the sky or from the ground.

In each of the above-mentioned embodiments, the electric wave transmit/receive means 200, 200*a* or 200*b* which consists of a cable-shaped electric wave transmitting means and a cable-shaped electric wave receiving means is placed so that it is running in a substantially straight line, as previously explained. As an alternative, the electric wave transmit/receive means 200, 200*a* or 200*b* can be placed so that it is running in a slightly curved line. In such a case, the position of the target 400 can be determined as the position Z, Z1 or Z2 of the target 400 in the longitudinal direction of the electric wave transmit/receive means 200, 200*a* or 200*b*, and the distance R, R1 or R2 between the target 400 and the electric wave transmit/receive means 200, 200*a* or 200*b* with respect to the normal passing through the position Z, Z1 or Z2.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An approach detecting system comprising:
   electric wave transmit/receive means having a cable-shaped electric wave transmitting means having radiation directivity which varies with frequency, and cable-shaped electric wave receiving means disposed substantially parallel to said electric wave transmitting means, for receiving an electric wave transmitted thereto from said electric wave transmitting means;
   measurement means for, when said electric wave receiving means receives a plurality of electric waves in different frequency bands which are transmitted from said electric wave transmitting means and are reflected by each of one or more targets, for outputting measurement information including signal intensity and phase of the reflected electric wave in each frequency band, and propagation delay time between transmission and reception of the plurality of electric waves in different frequency bands received by said electric wave receiving means; and
   calculating means for grouping the measurement information by target based on the signal intensities and phases of the plurality of reflected electric waves in different frequency bands, and for calculating position of each of the one or more targets with respect to a longitudinal direction of said electric wave transmit/receive means and distance between each of the one or more targets and said electric wave transmit/receive means based on the measurement information grouped by target.

2. The approach detecting system according to claim 1, including an alarm unit for issuing an alarm when a target remains in a predetermined alarm area.

3. The approach detecting system according to claim 1, wherein the frequency band of each electric wave transmitted from said electric wave transmitting means falls within a fundamental-mode region in which an electric wave is emitted from said electric wave transmitting means toward a single radiation direction when a single signal is supplied to said electric wave transmitting means.

4. The approach detecting system according to claim 3, including an alarm unit for issuing an alarm when a target remains in a predetermined alarm area.

5. The approach detecting system according to claim 1, wherein the frequency bands of the plurality of electric waves transmitted from said electric wave transmitting means fall within a higher-mode region in which electric waves are emitted from said electric wave transmitting means toward plural radiation directions when a single signal is supplied to said electric wave transmitting means.

6. The approach detecting system according to claim 5, including an alarm unit for issuing an alarm when a target remains in a predetermined alarm area.

7. An approach detecting system comprising:

plural sets of electric wave transmit/receive means having a cable-shaped electric wave transmitting means having radiation directivity which varies with frequency, and cable-shaped electric wave receiving means disposed substantially parallel to said electric wave transmitting means, for receiving an electric wave transmitted thereto from said electric wave transmitting means, measurement means for, when said electric wave receiving means receives a plurality of electric waves in different frequency bands which are transmitted from said electric wave transmitting means and are reflected by each of one or more targets, for outputting measurement information including signal intensity and phase of the reflected electric wave in each frequency band, and propagation delay time between transmission and reception of the plurality of electric waves in different frequency bands received by said electric wave receiving means, and calculating means for grouping the measurement information by target based on the signal intensities and phases of the plurality of reflected electric waves in different frequency bands, and for calculating position of each of the one or more targets with respect to a longitudinal direction of said electric wave transmit/receive means and distance between each of the one or more targets and said electric wave transmit/receive means based on the measurement information grouped by target; and three-dimensional position measurement means for measuring three-dimensional position of each of the one or more targets based on plural sets of the position and distance of each of the one or more targets which are acquired by said plural sets of said electric wave transmit/receive means, said measurement means, and said calculating means.

8. The approach detecting system according to claim 7, including an alarm unit for issuing an alarm, when a target remains in a predetermined alarm area.

* * * * *